July 28, 1931.  G. LOWENSTEIN  1,816,685
TRAVELING TURNTABLE
Filed Oct. 17, 1927   2 Sheets-Sheet 2

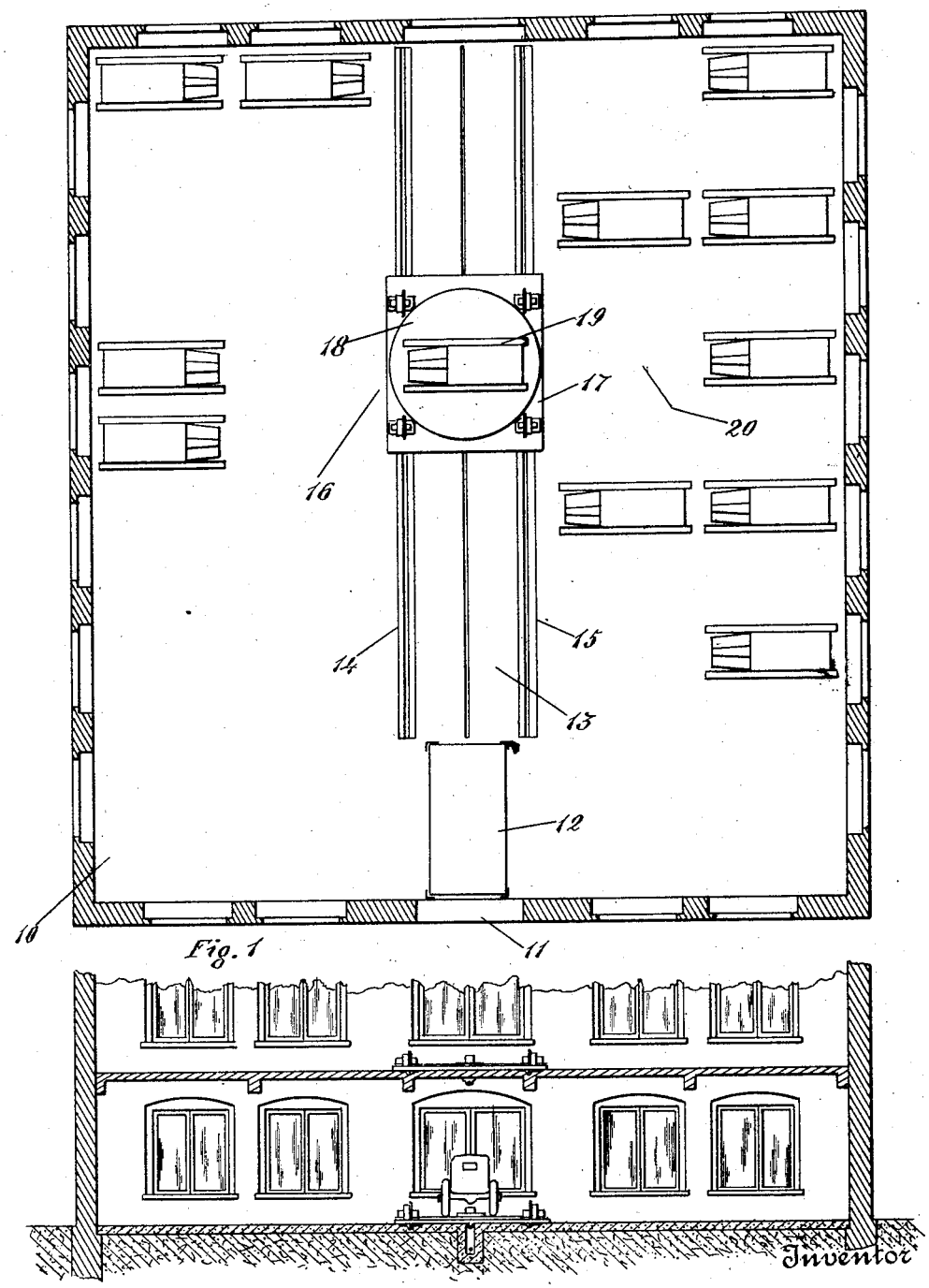

Inventor
Gothard Lowenstein
By his Attorney

Patented July 28, 1931

1,816,685

UNITED STATES PATENT OFFICE

GOTHARD LOWENSTEIN, OF BROOKLYN, NEW YORK

TRAVELING TURNTABLE

Application filed October 17, 1927. Serial No. 226,756.

This invention relates to means for handling and storing motor cars or other vehicles and more particularly refers to improvements in the design of traveling carriers provided with a turn table or platform adapted to effect turning movements of vehicles carried thereby without requiring the use of the power of said vehicles.

The primary object of this invention is to provide a carrier for motor cars and other vehicles of a novel and improved construction, comprising a traveling platform mounted on wheels, the wheels being so arranged in relation to the platform that the platform remains closely adjacent the underlying floor irrespective of the diameter of said wheels.

Another object is to provide a traveling carrier of a novel and improved construction adapted to receive and to transport motor cars or other vehicles from and to different points, said carrier comprising a platform mounted on wheels, provided with a turn table adapted to effect turning movements of the vehicles carried thereby within a relatively restricted space, said wheels being arranged in relation to said platform so that the platform will remain closely adjacent the underlying floor irrespective of the size of the wheels employed.

A further object is to provide a traveling turn table of a novel and improved design, comprising a platform mounted on wheels having a relatively large diameter, yet remaining very close to the underlying floor and a turn table mounted on said platform, free to rotate about a vertical pivot in order to effect turning movements of vehicles carried thereby, without interfering with the wheels or their means of support.

Other objects and advantages of the present invention will more fully appear as the description proceeds and will be set forth and claimed in the appended claims.

My invention is especially suitable for use in garages, where it is desirable to use the available space to best advantage and where the movements of the vehicles entering or leaving the building should be effected with the utmost safety and speed.

The greatest handicap to efficient use of the floor space in garages is generally the necessity of allowing ample free space for the turning movements of cars which are being driven to or removed from their stalls. Aside from the loss of space and revenue thus occasioned, the many turning and steering movements required in the average garage are a source of constant delay and are frequently also a source of damage to cars stored on the premises; so that from all standpoints it is very desirable that means be provided whereby vehicles may be easily handled and positioned within a garage in a manner permitting efficient use of the storage space at the same time insuring the safety of the vehicles thus handled and of the vehicles stored in their respective stalls.

Various arrangements have been proposed permitting a systematic arrangement of cars on a garage floor, these arrangements usually comprising means for transporting vehicles from the entrance of the garage to their stalls and for effecting the necessary turning movements in a relatively restricted space.

Among others, arrangements have been proposed entailing the use of platforms traveling along a runway, said platforms being provided with a turn table adapted to receive a car and to turn it in any direction without using the power plant of the car itself.

A platform thus traveling along a runway extending from the front entrance to the rear of the garage floor can therefore be used for receiving vehicles moving in the direction of the runway and for turning them about in a transverse direction ready to be driven on their own power to the stalls arranged in longitudinal series at each side of the runway.

An arrangement such as mentioned, is not in a broad sense new; for instance, Patents Nos. 1,378,168 and 1,567,346, illustrate and describe garage arrangements substantially including the elements mentioned, namely, a carrier comprising a platform traveling along a runway and a turn table mounted on said platform.

However, the carriers heretofore employed for the purpose mentioned are not well suited for use on the floors of existing garages, due to their construction.

The traveling platform is generally provided with wheels mounted underneath the platform, and therefore no matter how small the wheels employed may be, there will always remain a fairly wide clearance between the lower surface of the platform and the underlying floor.

If the thickness of the platform and the thickness of the turn table above it are added to this clearance, the resulting distance between the lower surface of the wheels and the top of the turn table is likely to make it necessary for the carrier to travel along a depressed runway if the top of the turn table is not to be raised an excessive height from the floor of the garage.

In practice it is frequently impossible to provide a depressed runway, unless a garage is built especially to suit the car handling equipment. On the other hand, practical considerations make it desirable for the floor to be as smooth and even as possible in order to permit free travel of vehicles and persons from one side of the room to the other.

Furthermore, from the standpoint of easy running qualities, the carriers should be equipped with wheels of fairly large diameter, this also permitting the use of shafts and supports of substantial size and strength.

I have accordingly produced a type of carrier which may be used on practically all garage floors, without requiring any material changes in said floors, being adapted to remain very close to the surface of the underlying floor, yet being mounted on wheels of substantial size.

The carrier comprises a platform and a turn table mounted thereon, said platform being preferably adapted to travel along a trackway. However, the inventive idea on which my invention is based can also be applied in connection with carriers adapted to travel directly on the underlying floor without the use of a trackway.

In the annexed drawings, I illustrate a preferred embodiment of my invention and in the same:

Fig. 1 is a plan view of the ground floor of a garage povided with my improved type of vehicle handling equipment;

Fig. 2 is a fragmentary cross sectional view in elevation of said garage showing the ground floor and part of the upper floor;

Figure 3:
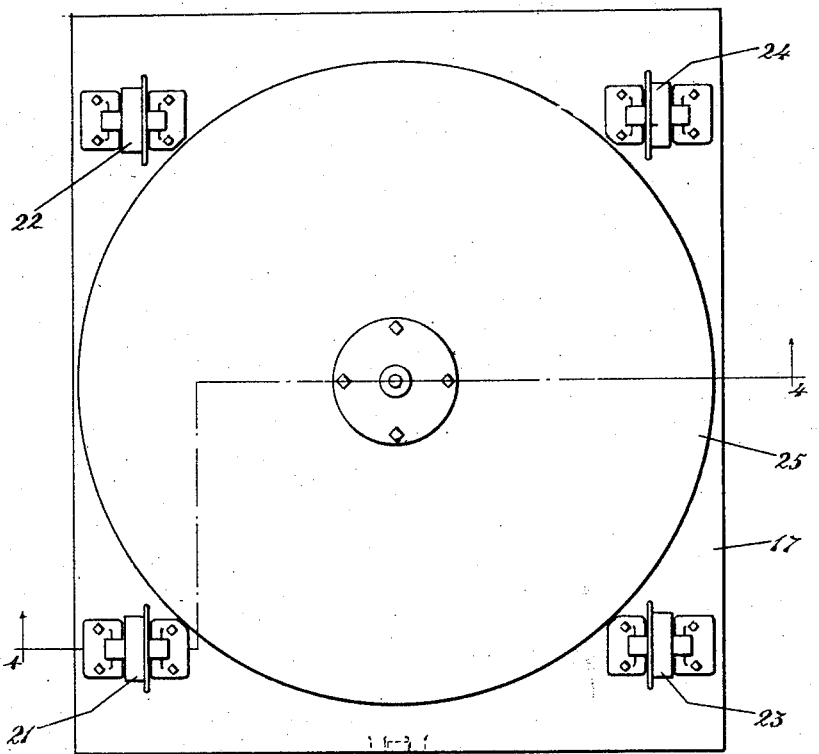
Fig. 3 is a plan view of a carrier embodying my invention.

Referring to Figs. 1 and 2, 10 designates the ground floor of a multistory garage provided with a front entrance 11 in front of which runs an elevator 12 which may carry said vehicles to any desired floor; similarly the elevator may also receive vehicles from any floor and carry them opposite the front entrance on the ground floor, ready to leave the garage.

In all cases, the vehicles are driven on or off the elevator platform with their axis directed longitudinally of said entrance.

Just past the elevator, the floor is provided with a longitudinal trackway 13 extending to the rear of the building, said trackway being formed by two rails 14, 15. 16 designates a carrier adapted to travel on said rails from a point at the front close to the elevator to the rear end of the floor, said carrier comprising a traveling platform 17 and a turn table 18 mounted on said platform.

As Fig. 1 clearly shows, turn table 18 is adapted to receive a vehicle 19 entering through entrance 11 and across the platform of elevator 12; the traveling platform can then be moved along the trackway to a predetermined point and the turn table can be turned 90° to one side or the other so as to dispose the vehicle 19 transversely of the trackway as shown.

In this position, the car may be driven on its own power to the stall 20, in alignment therewith, so that all necessity of turning or steering movements of the car on its own power is thus avoided.

By virtue of this arrangement, at each side of the trackway, the garage floor may be divided into a number of spaced stalls in which the cars can be stored, closely arranged side by side in a direction transversely of the trackway.

In the arrangement shown, the steering space at each side of the trackway is sufficient to accommodate two longitudinal rows of cars, each car being movable to and from the entrance independently of the others by means of the arrangement described. It is, of course, possible if desired, to change the location of the elevator and of the entrance in order to extend the track for the entire length of the floor, and in this respect the particular arrangement adopted in each case will be subject to considerations which may vary according to the size and shape of the floors, location of entrance, etc.

As stated before, however, one condition which is desirable in all cases is, that the surface on which the vehicle being moved by the carrier rests be raised as little as possible from the surface of the floor; and that this be obtained without necessitating material changes in the floor itself.

Furthermore, it is desirable that whatever changes are required in the floor in order to provide a trackway for the carrier, when a trackway is used, the uniformity of the level of the floor be disturbed as little as possible in order not to interfere with the normal traffic across the floor.

I achieve these results by providing the carriers with wheels, the under surface of which is only slightly projecting beyond the lower surface of the platform; said wheels being carried by shafts mounted well above the floor of the carrier's platform.

In this manner, there are no undue limitations placed on the diameter of the wheels used, the only condition being that the wheels should be so placed as not to interfere with the movements of vehicles being driven on or off the platform..

In the preferred type of carrier, where a turn table mounted on top of the platform is also used, another requirement is that the wheels should not interfere with the free angular movements of the turn table about its axis, which movement is required for changing the direction of a vehicle supported thereby.

Figure 4:
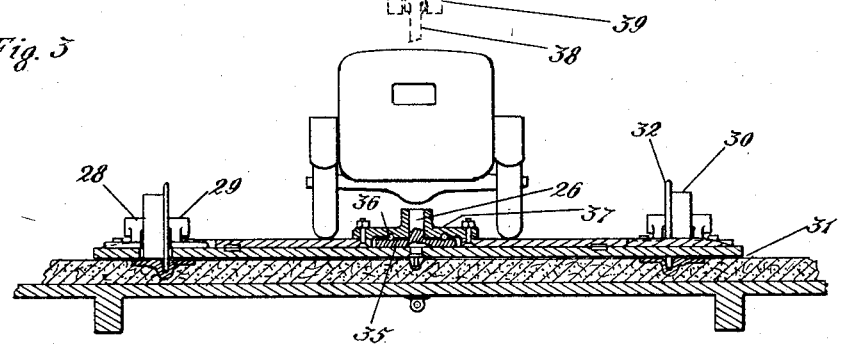
Fig. 4 is a cross sectional view in elevation of said carrier through line 4—4 of Fig. 3.
Figure 5:
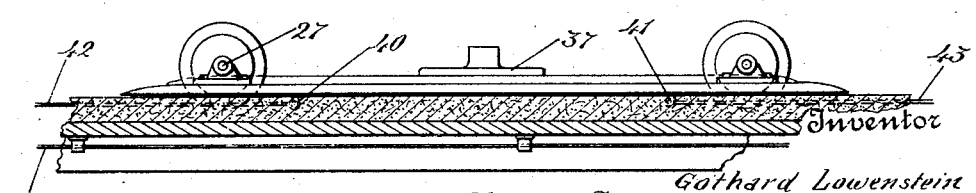
Fig. 5 is a side view in elevation of said carrier.

A typical construction of carrier embodying my invention is illustrated in detail in Figs. 3, 4 and 5. The carrier illustrated in said Figures is of the track running type, and is provided with a turn table affording convenient means for effecting turning movements of vehicles resting on said turn table.

In said drawings, 17 designates the platform provided with four wheels 21—22, 23—24, adapted to run on rails 14, 15 and 25 designates a turn table rotatably mounted on top of the platform and rotatable about central pivot 26.

The rails are so spaced that the clearance remaining between the two longitudinal sets of wheels is sufficient to allow free passage of all types of vehicles to be handled by the carrier. Furthermore, the front to rear distance separating the wheels is also such as to permit free rotation of turn table 25, the wheels are carried by transverse shafts such as 27 mounted on supports 28, 29, upwardly extending from the platform, and the diameter of the wheels is such that when their crown portion 30 rests on the underlying rails, the lower surface of the platform is substantially level with the floor, being separated from said floor by a very small clearance as indicated at 31 in Fig. 4.

For obvious reasons, it is desirable to have the rails themselves practically flush with the floor as the drawing shows, and therefore the lower part of the crown portion 30 of the wheels, projects but slightly beyond the lower surface of the platform, while the rim portion 32 engages the groove 33, 34, provided in the rails.

By virtue of this construction, it is possible to produce a structure such as illustrated where the surface of the turn table is comparatively close to the surface of the floor, so that a vehicle can be driven on or off the carrier with the utmost ease.

At the same time there is no strict limitation imposed upon the size of the wheels used for supporting the platform, so that wheels of comparatively large diameter can be employed insuring easy running qualities for the platform.

The turn table may be rotatably mounted upon the platform by means of a pivotal connection of any suitable design. Said pivotal connection may even project above the turn table as the drawings show, provided its total height does not interfere with the movements of the vehicle above. If desired, a ball or roller bearing may be provided between the platform and the turn table as shown in Fig. 4 where it is seen that pivot 26 is made integral with a plate 35, the latter forming a race for balls 36, and turn table 25 is provided with a central plate 37 inserted over pivot 26 and resting on top of said balls 36, forming a ball bearing pivotal connection.

A device of the same character can also be made for use on trackless floors and in such case, flat rimmed wheels will be used.

The device may be propelled along the track by hand, by means of a lever fragmentarily shown in dotted lines at 38 in Fig. 3, said lever being preferably attached to the carrier at 39; or else mechanical means of any suitable type for propelling the device may be used. As an example, the drawings show the device provided with attaching lugs 40, 41, projecting underneath the platform, one towards the front and one towards the rear, and two ends 42, 43 of an endless cable 44 attached to said lugs; said endless cable can, of course, be operated by means of a driving gear mounted at one end of the track, and said driving gear, which it is not necessary to illustrate, may in its turn be operated by hand or by power.

The turning movements of the turn table may conveniently be effected by hand, and if desired, means may be provided (not shown) for at times preventing angular movements of the turn table.

It is obvious that in cases where the garage is provided with a side entrance instead of or besides a front entrance, or in all those cases where it is possible to drive vehicles on or off the platform, transversely of the line of travel of said platform, a turn table will not be required; and in such cases, the device may be limited to a platform provided with wheels supporting the platform and maintaining it close to the floor, as described, the turn table being omitted altogether.

The drawings will be understood as being intended for illustrative purposes only, because it is apparent that the details of the construction of the device may be varied to a considerable extent without departing from the inventive idea.

It is equally obvious that the arrangement of the garage space and of the runway or runways, equipped with carriers of the type described, may be altered to suit conditions existing in various cases; since the arrangement to be adopted in each case is usually dependent upon the size and shape of the garage floor, location of entrance and elevators and so forth.

I therefore reserve myself the right to carry my invention into practice in all those ways and manners which may enter, fairly, into the scope of the appended claims.

I claim:

1. In a device of the class described, a carrier comprising a platform adapted to travel along a floor, wheels supporting said platform having their undersides projecting but slightly beyond the lower surface of said platform, so as to allow a small clearance between said platform and the surface over which it travels, and a turn table mounted on said platform.

2. In a device of the class described, a carrier comprising a platform adapted to travel along a floor, wheels supporting said platform, said wheels projecting above said platform and having their undersides projecting but slightly beyond the lower surface of said platform so as to allow a small clearance between said platform and the surface over which it travels, said wheels being transversely spaced so as to allow free passage of a vehicle to be loaded on said platform, and a turn table mounted on said platform.

GOTHARD LÖWENSTEIN.